United States Patent

Cone, II et al.

[11] Patent Number: 5,625,956
[45] Date of Patent: May 6, 1997

[54] LEVEL INDICATOR FOR CHILD SEAT

[75] Inventors: Richard E. Cone, II, Athens, Ohio; Alvin L. Fowler, Columbus, Ind.

[73] Assignee: Cosco, Inc., Columbus, Ind.

[21] Appl. No.: 334,721

[22] Filed: Nov. 4, 1994

[51] Int. Cl.$^6$ .................................... G01C 9/00
[52] U.S. Cl. .................. 33/370; 33/347; 33/365; 33/333
[58] Field of Search ................... 33/365, 370, 371, 33/395, 398, 399, 400, 347, 333; 116/215

[56] References Cited

U.S. PATENT DOCUMENTS

| | | |
|---|---|---|
| 28,088 | 5/1860 | Keeler . |
| 466,380 | 1/1892 | Spencer ........................ 33/365 |
| 474,861 | 5/1892 | Rush ............................ 33/399 |
| 559,090 | 4/1896 | West ............................ 33/365 |
| 685,569 | 10/1901 | Bullard . |
| 2,168,885 | 8/1939 | Rickenbach et al. ........... 33/365 |
| 2,411,165 | 11/1946 | McBride ...................... 33/365 |
| 2,527,982 | 10/1950 | Brock . |
| 2,617,381 | 11/1952 | Insul .......................... 116/215 |
| 2,871,573 | 2/1959 | Schenker ..................... 33/371 |
| 2,930,343 | 3/1960 | Derrick ....................... 116/215 |
| 3,118,234 | 1/1964 | Wilson ........................ 33/371 |
| 3,269,729 | 8/1966 | Morrison . |
| 3,422,544 | 1/1969 | Wyse . |
| 4,100,681 | 7/1978 | Hollander . |
| 4,126,944 | 11/1978 | Burkhart . |
| 4,228,982 | 10/1980 | Sellera . |
| 4,335,523 | 6/1982 | Bryant ........................ 33/371 |
| 4,554,994 | 11/1985 | Weiner . |
| 4,775,183 | 10/1988 | Tsuge et al. . |
| 4,888,875 | 12/1989 | Strother . |
| 4,944,094 | 7/1990 | Depiano et al. . |
| 5,051,044 | 9/1991 | Allen . |
| 5,058,283 | 10/1991 | Wise et al. ................... 33/371 |
| 5,167,075 | 12/1992 | Weldy et al. . |
| 5,263,260 | 11/1993 | Smith . |

FOREIGN PATENT DOCUMENTS

| | | | |
|---|---|---|---|
| 600013 | 1/1926 | France ........................ 33/365 |
| 35523 | 12/1908 | Germany ..................... 33/370 |
| 117143 | 7/1918 | United Kingdom ........... 33/371 |

*Primary Examiner*—Thomas B. Will
*Attorney, Agent, or Firm*—Barnes & Thornburg

[57] ABSTRACT

A level indicator for a child seat equipped with a rotatable carrying handle rotatably attached thereto, and having a housing in a hub of said pivotal handle with a wall defining an interior region of said hub and an indicator member having an indicator surface. The indicator member is movably received in the interior region and the wall is formed to include a transparent window defined by an edge formed in the wall, the edge being arranged so that the indicator surface is visible through the window when the level indicator is level, with the indicator member moving entirely away from the window edge when the level indicator is not level so that the indicator surface is not visible through the window. The indicator member is disclosed as being a gravity ball that freely rotates in a curved track or a pendulum rotating in the handle.

41 Claims, 4 Drawing Sheets

U.S. Patent    May 6, 1997    Sheet 2 of 4    5,625,956
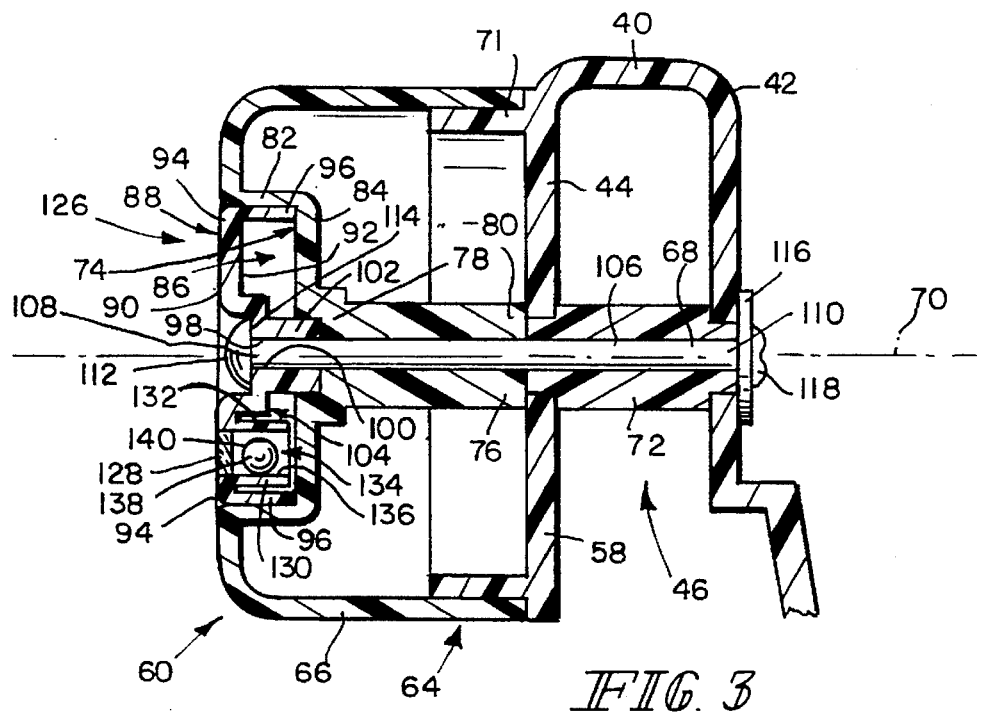
FIG. 3
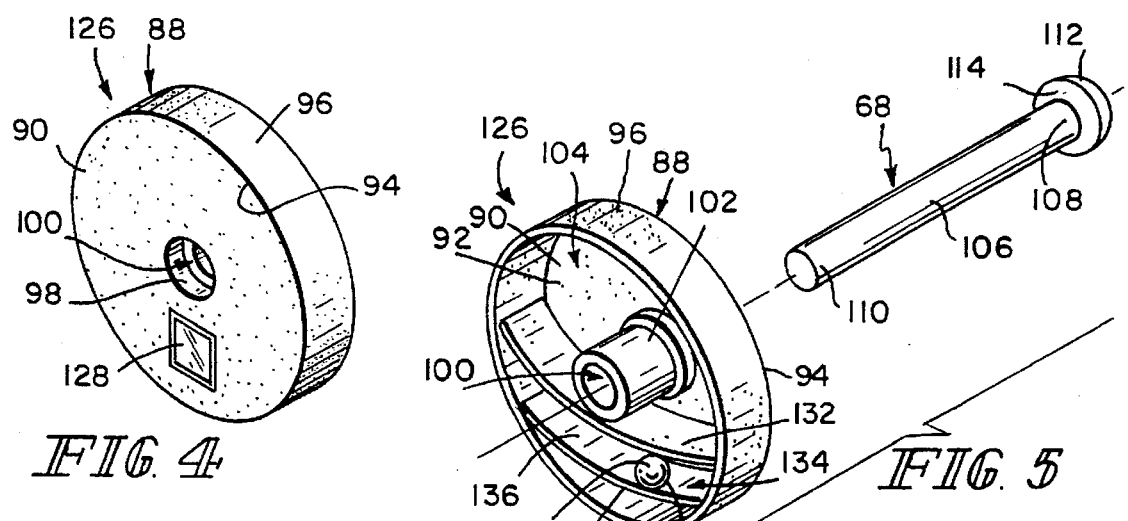
FIG. 4    FIG. 5
FIG. 6    FIG. 7

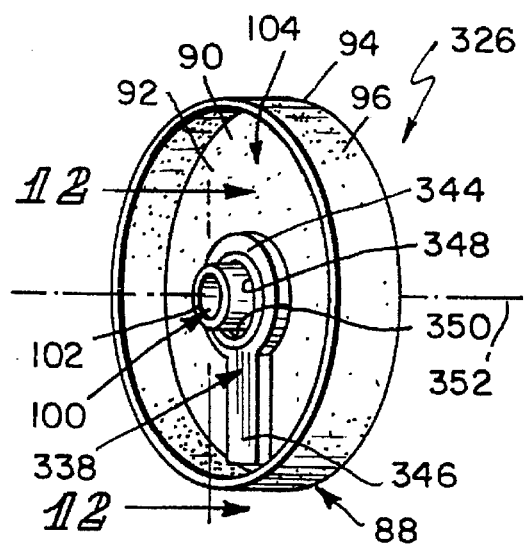
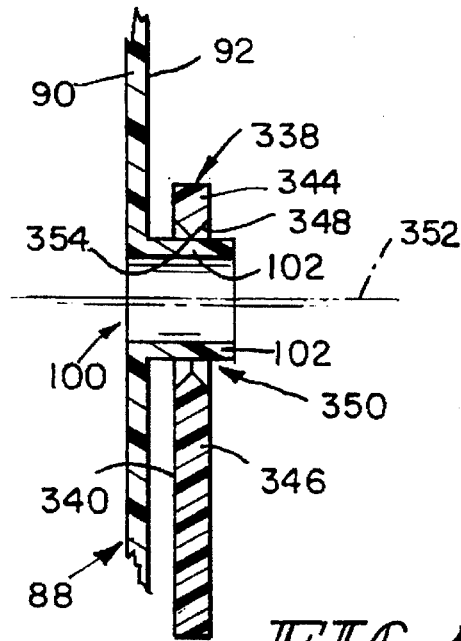
FIG. 11　　　　　FIG. 12
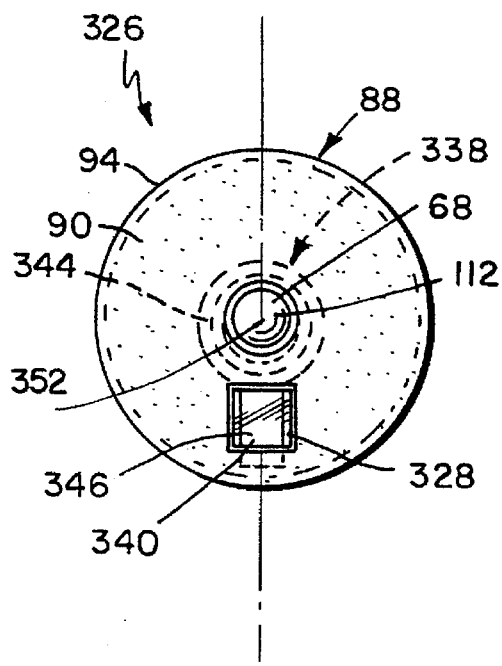
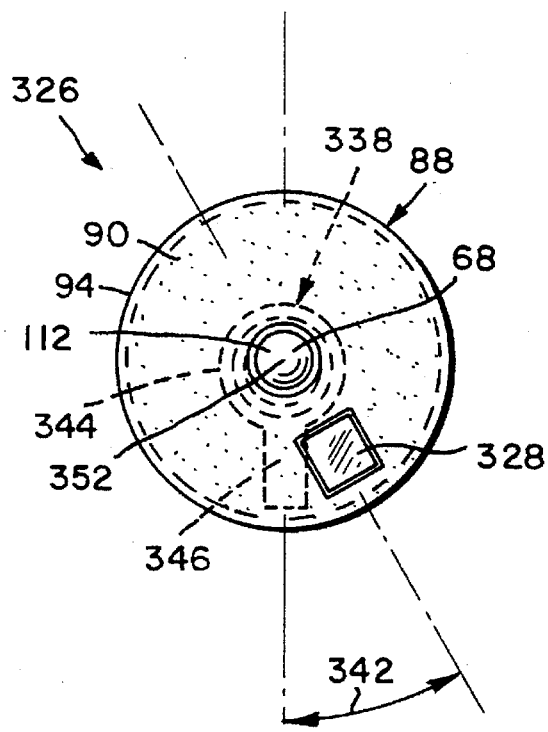
FIG. 13　　　　　FIG. 14

LEVEL INDICATOR FOR CHILD SEAT

BACKGROUND AND SUMMARY OF THE INVENTION

The present invention relates to child restraint systems, and particularly to a level indicator for a child seat. More particularly, the present invention relates to a level indicator for use on a child seat that is easily and readily coupled to and uncoupled from the seat of a vehicle such as an automobile, the level indicator signalling to a care giver whether or not the child seat is properly leveled when installed in the seat of the vehicle.

Child car seats are widely accepted as a necessary appliance for transporting young children in automobiles or other vehicles. The proper installation of a child seat onto the seat of a vehicle is critical to the proper operation of the child seat. Typically, child car seats are designed to be installed having a specific rotational orientation with respect to roads that the vehicle will be travelling, and achieving the proper orientation is a necessary prerequisite to the proper installation of the child seat onto the seat of a vehicle.

Providing a level indicator to assist a user at orienting an object is widely accepted as a useful accommodation, and providing level indicators on appliances is well known in the art. For example, U.S. Pat. No. 5,263,260 to Smith, U.S. Pat. No. 5,167,075 to Weldy et al., U.S. Pat. No. 5,051,044 to Allen, U.S. Pat. No. 4,944,094 to Depiano et al., U.S. Pat. No. 4,888,875 to Strother, U.S. Pat. No. 4,554,994 to Weiner, U.S. Pat. No. 4,228,982 to Sellera, U.S. Pat. No. 4,126,944 to Burkhart, U.S. Pat. No. 4,100,681 to Hollander, U.S. Pat. No. 3,422,544 to Wyse, U.S. Pat. No. 3,269,729 to Morrison, U.S. Pat. No. 2,527,982 to Brock, U.S. Pat. No. 685,569 to Bullard, and U.S. Pat. No. 28,088 to Keeler all disclose level indicators mounted to various objects that users prefer to maintain at specific predetermined orientations. In addition, U.S. Pat. No. 5,058,283 to Wise et al. discloses a level indicator mounted to a child car seat.

What is needed is an indicator to advise care givers that a child seat installed on the seat of a vehicle has or has not yet achieved the proper rotational orientation. Care givers would appreciate a conveniently placed indicator that readily and easily informs them as to whether the seat is properly oriented without requiring any specific acts by the care giver beyond glancing at the indicator to achieve an indication. Manufacturers would welcome a device requiring a minimum number of assembly parts to minimize manufacturing costs, while at the same time being mountable to various shapes and sizes of child seats so as to minimize design disruption required for facilitating the indicator.

According to the present invention, a level indicator is provided for a child seat. The level indicator includes an opaque front wall having an interior surface. An indicator member having an indicator surface is movably positioned adjacent to the interior surface. A transparent window is formed in the wall and is arranged so that the indicator surface is visible through the window when the level indicator is level. A level indicator can be fixed to a child seat and oriented so that a "level" indication received on the indicator of the child seat installed on the seat of a vehicle resting on a level surface advises the care giver that the child seat is properly oriented.

The indicator surface of the level indicator in accordance with the present invention is visible through the window when the level indicator is level. Unlike level indicators having an indicator member and a tube having graduation marks in which a level orientation is indicated by the position of the indicator member relative to the indicator marks, the indicator member of the level indicator in accordance with the present invention is visible only when the level indicator achieves a level orientation.

A care giver installing a child seat having a level indicator in accordance with the present invention onto the seat of a vehicle can simply glance at the level indicator to be advised as to the orientation of the child seat. If the indicator surface is visible, the care giver will be advised that the orientation of the child seat is correct. If the indicator surface is not visible, the care giver will be advised that the installation of the child car seat is incorrect because the child seat is not yet oriented properly. This simplicity in determining whether the proper orientation has been achieved will be appreciated by care givers.

In preferred embodiments of the level indicator, an arcuate track having a ball-receiving surface is appended to the interior surface of the front wall. A ball is movably positioned on the arcuate track and an exterior surface of the ball is the indicator surface. The transparent window formed in the front wall is arranged so that the ball is visible through the window when the level indicator is level.

In addition, the front wall can be round and formed to include a circumferential edge. An annular wall extending in a direction perpendicular to the front wall can be appended to the edge of the front wall so that the front wall and the annular wall combine to form a housing. Conveniently, the arcuate track can either be integrally appended to the annular wall or can be a separate component appended to the interior surface of the front wall.

In another embodiment, a pendulum having an indicator surface can be mounted to the interior surface of the front wall. The pendulum can be mounted to swing and have an indicator surface that drops in front of the indicator window when the level indicator is level so that the indicator surface is visible through the transparent window when the level indicator is level. As with the previous embodiment of the level indicator, the care giver can simply glance at the indicator and know that if the indicator surface is visible, the orientation of the child seat is correct.

Preferably, the front wall further includes a front edge arranged to define a rod-receiving aperture in the wall. A rod including a shaft having a first end fixed to the child seat and a second end that is integrally appended to a head is received by the rod-receiving aperture. The diameter of the head is greater than the diameter of the shaft so that a housing-engaging surface of the head is formed adjacent to the shaft.

The rod is received by the rod-receiving aperture and fixed to the child seat and the housing-engaging surface engages the front wall of the housing adjacent to the rod-receiving aperture. The housing is held to the child seat by the housing-engaging surface of the head positioned in front of the housing so that the means for adhering the housing to the child seat is located on the front of the housing.

Advantageously, the housing is designed to be mounted directly to a child seat without a back plate or any backing material interposed between the housing and the child seat. The use of an indicator window formed in an opaque wall positioned on the front of the level indicator renders markings or colorings on the child seat behind the wall or adjacent to the wall irrelevant with respect to indicating the orientation of the child seat.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a sectional view taken along line 3—3 of FIG. 2 showing a round indicator member resting in an indicator housing mounted inside of a level indicator container formed in the hub cover and held in place against the child seat by a horizontal rivet having a head in engagement with the front of the level indicator housing;

FIGS. 4–7 show a first embodiment of a level indicator in accordance with the present invention in which FIG. 4 is a perspective view of the first embodiment of the level indicator showing an opaque front wall having a transparent indicator window, an annular wall appended to an edge of the front wall, and a rod-receiving aperture formed in the front wall;

FIG. 5 is a perspective view of the level indicator of FIG. 4 showing an interior surface of the front wall, the annular wall appended to the edge of the front wall, two arcuate tracks integrally appended to the interior surface of the front wall and arranged to define a ball-receiving space therebetween, an indicator ball movably received in the ball-receiving space, and a center annular wall appended to the interior surface adjacent to the rod-receiving aperture and arranged to receive a rivet;

FIG. 6 is a front elevation view of the level indicator of FIG. 5 having the level indicator in a level orientation showing the round rod-receiving aperture centered on the front wall, the arcuate tracks (in phantom) hidden behind the opaque portion of front wall, the square transparent window formed in the front wall, and the indicator ball being visible behind the transparent window;

FIG. 7 is a view similar to FIG. 6 but having the level indicator in a non-level orientation showing the arcuate tracks (in phantom) and the ball (in phantom) hidden from view behind the opaque portion of the front wall;

FIGS. 8–10 show a second embodiment of a level indicator in accordance with the present invention in which FIG. 8 is a perspective view of the second embodiment of the level indicator showing an interior surface of a front wall, an annular wall appended to an outer edge of the front wall, an annular wall appended to the center of the interior surface of the front wall, and an indicator ball movably received on an interior ball-receiving surface of the annular wall;

FIG. 9 is an elevation view of the front of the level indicator of FIG. 8 having the level indicator in a level orientation showing the round rod-receiving aperture centered on the front wall, the square transparent window formed in the front wall, and the indicator ball being visible behind the transparent window;

FIG. 10 is a view similar to FIG. 9 but having the level indicator in a non-level orientation showing the ball (in phantom) hidden from view behind the opaque portion of the front wall;

FIGS. 11–14 show a third embodiment of a level indicator in accordance with the present invention in which FIG. 11 is a perspective view of the third embodiment of the level indicator showing an interior surface of a front wall, an annular wall appended to an outer edge of the front wall, an annular pendulum-receiving wall appended to the center of the interior surface of the front wall, and a pendulum having a lower surface of the pendulum defining an indicator surface, the pendulum being pivotably received on the pendulum-receiving wall;

FIG. 12 is a sectional view taken along line 12—12 of FIG. 11 showing the front wall, the pendulumreceiving wall projecting outwardly from the interior surface of the front wall, and the pendulum having an annular knife-edge in engagement with the pendulum-receiving wall;

FIG. 13 is an elevation view of the front of the level indicator of FIG. 12 having the level indicator in a level orientation showing the round rod-receiving aperture centered on the front wall, the square transparent window formed in the front wall, and the indicator surface of the pendulum being visible behind the transparent window; and FIG. 14 is a view similar to FIG. 13 but having the level indicator in a non-level orientation showing the indicator surface of the pendulum (in phantom) hidden from view behind the opaque portion of the front wall.

DETAILED DESCRIPTION OF THE DRAWINGS

Figure 1:
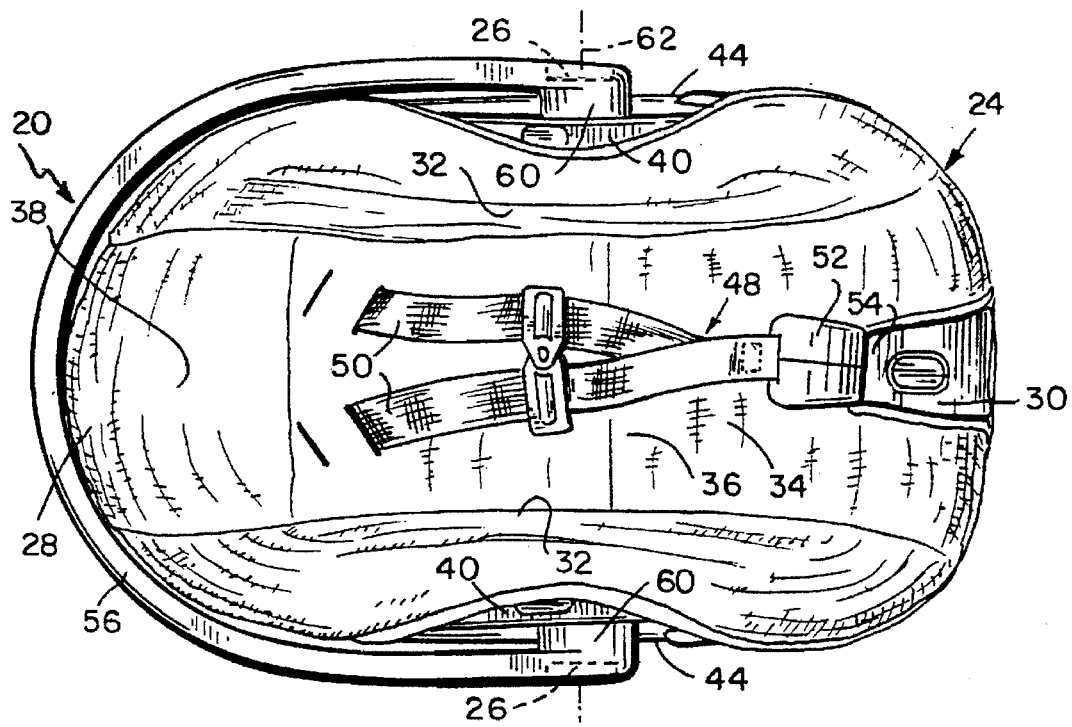
FIG. 1 is a plan view of a child car seat including a base and a child seat on top of the base, the child seat having a head end, a foot end, two spaced-apart side edges therebetween, side arms appended to the side edges and extending upwardly therefrom, and a U-shaped handle with hubs appended to the terminal ends of the handle, the hubs being appended to the side arms showing two level indicators in accordance with the present invention (in phantom) mounted in the hubs adjacent to a pivot axis of the seat.
Figure 2:
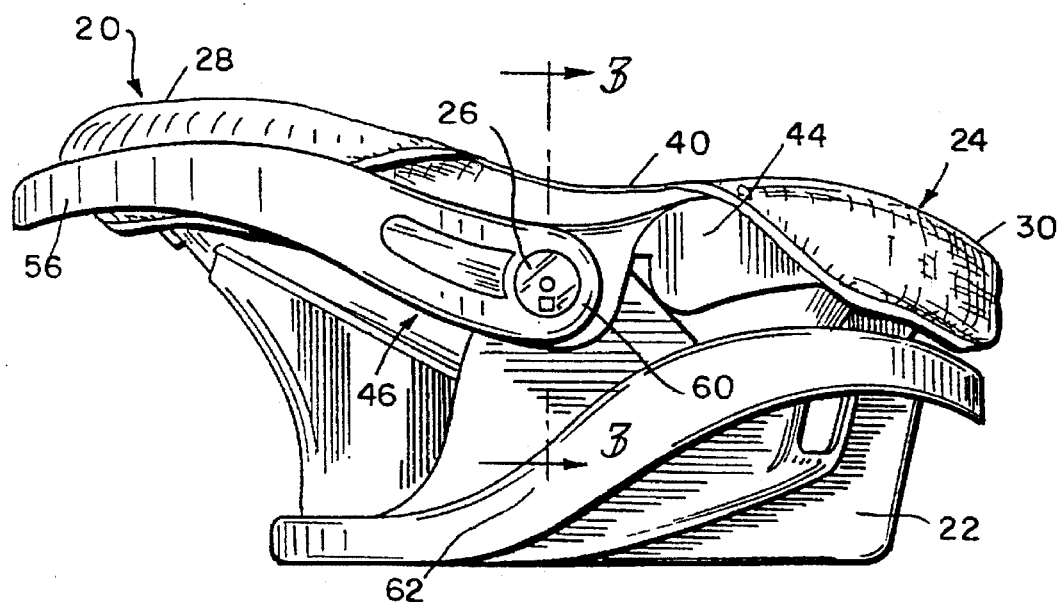
FIG. 2 is an elevation view of the child car seat of FIG. 1 showing the child seat resting in the base and the round level indicator mounted in the hub of the handle.

As shown in FIGS. 1 and 2, child car seat 20 includes a detachable base 22 and an child seat 24. Child seat 24 is removable from the base 22 so that it can be used by itself to transport an infant or child (not shown) easily. For example, the base 22 can be fixed in place on an automobile seat or the like and arranged to receive and support child seat 24. The child seat 24 can be mounted on the fixed detachable base 22 while the child is traveling in the automobile and then can be removed from the base 22 and used by itself to transport the child to and from the automobile or any other destination. Additionally, the child seat 24 can be mounted directly on an automobile seat or the like while the infant is traveling in the automobile to permit travel in a vehicle with the child when the base 22 is not conveniently accessible.

A level indicator 26 is mounted to the child seat 24 and is arranged so that when the child seat 24 is installed on the seat of a vehicle (not shown) and is in the proper orientation relative to a level surface (not shown) on which the vehicle is resting, the level indicator 26 indicates that the indicator is level, thereby indicating that the orientation of the child seat 24 is correct. Care givers using child seats intended for use on the seat of a vehicle and that are frequently mounted to and removed from vehicle seats will appreciate the convenience derived from use of a child seat 24 in accordance with the present invention having a level indicator 26 mounted to the child seat 24.

Child seat 24 includes a head end 28, a foot end 30, and two longitudinally extending inner side walls 32 therebetween as shown best in FIGS. 1 and 2. Child seat 24 is formed to include a seat bottom 34 having a back edge 36 and a seat back 38 appended to the back edge 36 and extending upwardly therefrom. The seat bottom 34 and seat back 38 are sized and shaped to receive a child therein. The child seat 24 is also formed to include a top wall 40 appended to a top edge 42 of the inner side wall 32 and positioned to lie approximately perpendicular to the inner side walls 32, as shown, for example, in FIG. 3. The top wall 40 extends along the entire circumference of the child seat 24. A downwardly extending outer side wall 44 is integrally appended to the top wall 40 along the circumference of the top wall 40 to form a downwardly facing U-shaped channel 46 around the child seat 24.

A harness 48 is provided to restrain an infant seated on the seat bottom 34. Harness 48 includes two shoulder straps 50 joined together by a buckle 52 and a crotch strap (not shown) carrying a tongue (not shown) that is connectable to buckle 52 and is attached to the floor 54 of the child seat 24. The harness 48 can be used to restrain a child seated in child seat 24 and buckle 52 can be disengaged to release the child therefrom.

A pivotable U-shaped handle 56 is coupled to the outer side walls 44 of the child seat 24 to facilitate transport of the portable child car seat 20. The U-shaped handle 56 is coupled to a hub-receiving platform 58 of the outer side wall 44 by two rotatable hubs 60 as shown best in FIGS. 2 and 3. The hubs 60 are mounted to opposing sides of the child seat 24 approximately half-way between the head end 28 and the foot end 30 adjacent to the back edge 36 of the seat bottom 34 where the seat bottom 34 meets the seat back 38. This juncture of the seat back 38 and the seat bottom 34 is a pivot axis 62 illustrated in FIG. 2 about which the child seat 24 pivots as the orientation of the child seat 24 is adjusted.

The hubs 60 include hub walls 64 that are integrally appended to the terminal ends of the U-shaped handle 56 and are arranged to define hub covers 66. An annular hub cover-positioning wall 71 is integrally appended to each hub-receiving platform 58 and the hub covers 66 envelope and slidably engage the hub cover-positioning walls 71. Each hub wall 64 is rotatably mounted to the hub-receiving platform 58 by a rod 68 that is coincident with the axis of rotation 70 of the hub 60 as shown in FIG. 3. The rod 68 additionally supports a post 72 located inside of the U-shaped channel 46 and in engagement with both the hub-receiving platform 58 and the inner side wall 32. The post 72 provides support to maintain a spaced-apart relationship of the inner side wall 32 and the outer side wall 44 illustrated in FIG. 3.

The hub wall 64 is arranged to define a level indicator container 74 and a hub cover-support post 76. The hub cover support post 76 has a first end 78 in engagement with the level indicator container 74 and a second end 80 in engagement with the hub-receiving platform 58. The level indicator container 74 includes an annular side wall 82 that is integrally appended to the hub cover 15 66 and a back wall 84 that is integrally appended to the side wall 82. The side wall 82 and the back wall 84 cooperate to define a level indicator-receiving space 86 receiving level indicator 26 so that level indicator 26 rotates with hub wall 64 as U-shaped handle 56 pivots. Preferably, level inidicator 26 is level when U-shaped handle 56 picots to the position shown in FIG. 2. Though the level indicator containers 74 are positioned to lie in the hubs 60 of the U-shaped handle 56, alternate placements of the level indicator containers 74 on the child seat 24 are within the scope of the invention as presently perceived.

Illustratively, a first embodiment of a level indicator 126 is shown in FIG. 3 received in the level indicator-receiving space 86. Though level indicator 126 is illustrated, the discussion immediately below relates to all of the embodiments as presently perceived. To enhance clarity of the discussion, reference is made to level indicator 26 unless a feature unique to a specific embodiment is being discussed, at which time reference is made to the specific embodiment.

The illustrative level indicator 26 of FIG. 3 includes a level indicator housing 88 having an opaque front wall 90. The front wall 90 is formed to include an interior surface 92, a circumferential edge 94, and an annular side wall 96 appended to the edge 94 of the front wall 90. In addition, the front wall 90 further includes a center edge 98 arranged to define a rod-receiving aperture 100, and an annular center wall 102 appended to the interior surface 92 of the center edge 98 of the front wall 90. The back wall 84 of the level indicator container 74 formed in each hub 60 cooperates with the level indicator housing 88 to define an interior region 104 of the level indicator 26.

It is within the scope of the invention as presently perceived to produce the level indicator 26 with no annular side wall 96 appended to the edge 94 of the front wall 90. Instead, the level indicator container 74 can be formed to engage the edge 94 of the front wall 90, and the annular side wall 82 of the indicator container 74 can cooperate with the back wall 84 of the indicator container 74 and the interior surface 92 of the front wall 90 of the level indicator housing 88 to define the interior region 104 of the level indicator 26.

Each rod 68 includes a shaft 106 having a proximal end 108 and a distal end 110, and a head 112 integrally appended to the proximal end 108. The shaft 106 is sized to be received by the rod-receiving aperture 100 and the annular center wall 102 of the front wall 90. The head 112 of the rod 68 is sized to be too large to penetrate the rod-receiving aperture 100. The head 112 is formed to include a wall-engaging surface 114 that is arranged to engage the wall 90 adjacent to the rod-receiving aperture 100. The distal end 110 of the shaft 106 is appended to the inner side wall 32, so that the engagement of the wall-engaging surface 114 of the rod 68 and the wall 90 provides means located on a front portion of the level indicator housing 88 for adhering the level indicator to the child seat 24.

The illustrative rod 68 shown in FIGS. 3 and 5 is a rivet, and the means for appending the rod 68 to the inner side wall 32 is simply a washer 116 about which the distal end 110 of the shaft 106, after being received by the washer 116, is flattened to form a head 118. The head 118 is sized to be too large to penetrate the washer 116 thereby preventing movement of the distal end 110 back toward the outer side wall 44. It is within the scope of the invention as presently perceived, however, to secure the distal end 110 of the rod 68 using any suitable means including gluing the distal end 110 to the inner side wall 32 or to an anchoring piece adjacent to the inner side wall 32, or providing threads on the distal end of the rod 68 which threads are arranged to engage the inner side wall 32 or an anchoring piece adjacent to the inner side wall 32.

A first embodiment of a level indicator 126 in accordance with the present invention is illustrated in FIGS. 3-7. As described above with respect to level indicator 26, the level indicator 126 includes a level indicator housing 88 having an opaque front wall 90. Illustratively, the front wall 90 is round. It should be noted that although the illustrative front wall 90 is round, the front wall 90 can be arranged to define any shape that is convenient for the users or the manufacturers of the child seats 24.

A transparent window 128 is formed in the wall 90 of the level indicator 126 as shown in FIG. 4. Illustratively, the window 128 is square-shaped, though any suitable shape for the window 128 including a round, a triangular, or a pie-shaped window is within the scope of the invention as presently perceived.

A lower arcuate track 130 and an upper arcuate track 132 are integrally appended to the interior surface 92 of the wall 90 illustrated in FIG. 5. The tracks 130, 132 are positioned to lie in spaced-apart relation to define a ball-receiving space 134 therebetween. The lower track 130 is formed to include an upwardly facing ball-receiving surface 136. A ball 138 is received in the ball-receiving space 134 and movably engages the ball-receiving surface 136. As the angular orientation of the level indicator 126 is adjusted, the ball 138 moves along the ball-receiving surface 136 to the lowest point available along the ball-receiving surface 136.

The window 128 is positioned to lie adjacent to the ball-receiving space 134 so that the ball 138 is visible through the window 128 when the level indicator 126 is in the level orientation as shown in FIG. 6. An indicator surface 140 envelopes the full exterior of the ball 138. In preferred embodiments, the indicator surface 140 is a bright color chosen to draw the attention of the care giver when the level indicator 126 is in the level orientation and the indicator surface 140 of the ball 138 is positioned on the ball-receiving surface 136 adjacent to the window 128, as shown in FIG. 6.

When the level indicator 126 is not in the level orientation, as shown in FIG. 7 in which the level indicator 126 is held at an angle 142 away from the level orientation, the ball 138 moves to a position on the ball-receiving surface 136 away from the window 128. In this position, the indicator surface 140 of the ball 138 is obscured by the wall 90 and is not visible to the care giver. A care giver would be informed, after glancing at level indicator 126 in the orientation of FIG. 7 and seeing no indicator surface 140, that the child seat 24 was not yet properly oriented on the seat (not shown) of the vehicle (not shown).

The lower track 130 is arranged so that the shape of the ball-receiving surface 136 provides the ball 138 with an arcuate path having a predetermined radius 144. As the radius 144 is decreased, the arc becomes more severe requiring that the level indicator 126 is moved to a greater angle 142 to achieve the same displacement of the ball 138 as was achieved using the less severe arc. Likewise, if the radius 144 is increased, the arc becomes less severe requiring that the level indicator 126 is moved to a smaller angle 142 to achieve the same displacement of the ball 138 as was achieved using the more severe arc. Consequently, the manufacturer can adjust the angle 142 required to move the ball 138 to a position on the ball-receiving surface 136 away from the window 128 by adjusting the radius 144 of the arcuate path 146 of the ball 138.

Figure 8:
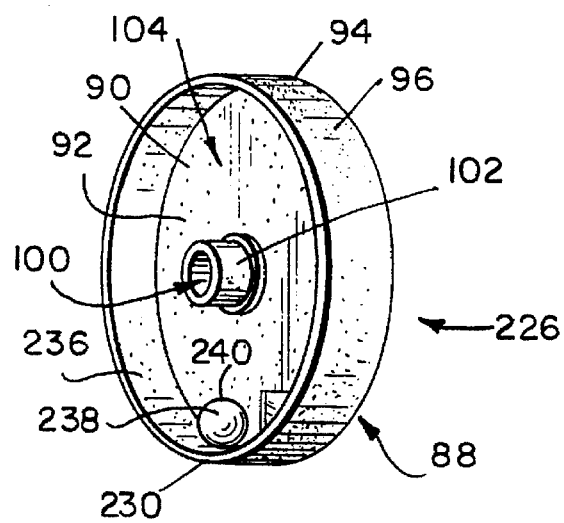
Figure 9:
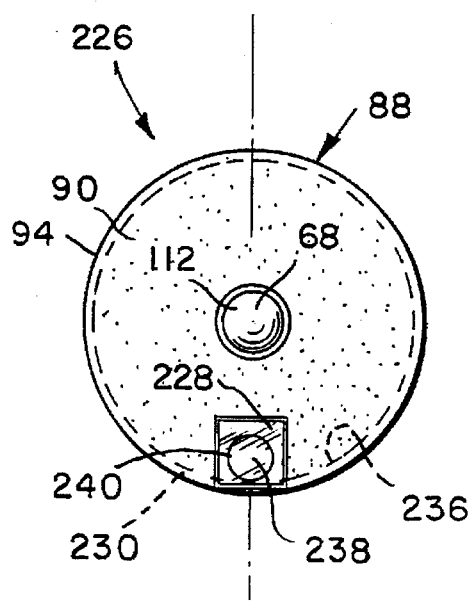
Figure 10:
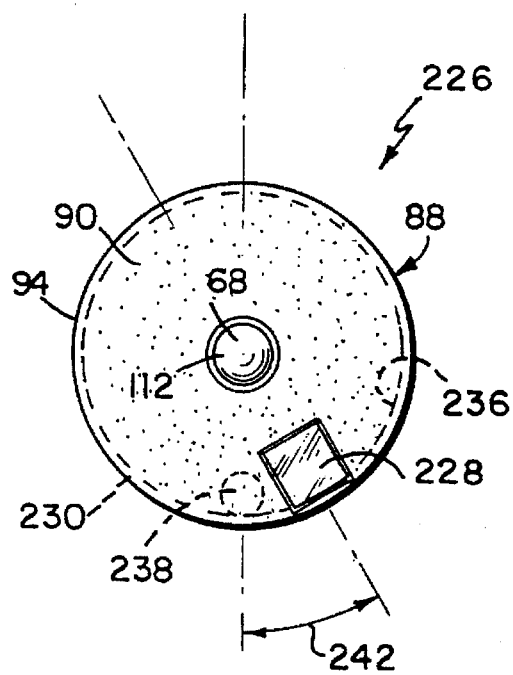

A second embodiment of a level indicator 226 in accordance with the present invention is illustrated in FIGS. 8–10. As described above with respect to level indicator 26, a transparent window 228 is formed in the wall 90 of the level indicator 226 as shown in FIGS. 9 and 10. Illustratively, the window 228 is square-shaped, though any suitable shape for the window 228 including a round, a triangular, or a pie-shaped window is within the scope of the invention as presently perceived.

Annular side wall 96 includes an arcuate track portion 230 formed as part of the annular side wall 96 illustrated in FIG. 8. The arcuate track portion 230 includes an upwardly facing ball-receiving surface 236. A ball 238 is received in the interior region 104 of the level indicator 226 and movably engages the ball-receiving surface 236.

The window 228 is positioned to lie adjacent to the ball-receiving surface 236 so that the ball 238 is visible through the window 228 when the level indicator 226 is in the level orientation as shown in FIG. 9. An indicator surface 240 envelopes the full exterior of the ball 238. In preferred embodiments, the indicator surface 240 is a bright color chosen to draw the attention of the care giver when the level indicator 226 is in the level orientation and the indicator surface 240 of the ball 238 is positioned on the ball-receiving surface 236 adjacent to the window 228, as shown in FIG. 9.

When the level indicator 226 is not in the level orientation, as shown in FIG. 10 in which the level indicator 226 is held at an angle 242 away from the level orientation, the ball 238 moves to a position on the ball-receiving surface 236 away from the window 228. In this position, the indicator surface 240 of the ball 238 is obscured by the wall 90 and is not visible to the care giver. A care giver would be informed, after glancing at level indicator 226 in the orientation of FIG. 10 and seeing no indicator surface 240, that the child seat 24 was not yet properly oriented on the seat (not shown) of the vehicle (not shown).

A third embodiment of a level indicator 326 in accordance with the present invention is illustrated in FIGS. 11–14. As described above with respect to level indicator 26, a transparent window 328 is formed in the wall 90 of the level indicator 326 as shown in FIG. 13. Illustratively, the window 328 is square-shaped, though any suitable shape for the window 328 including a round, a triangular, or a pie-shaped window is within the scope of the invention as presently perceived.

A pendulum 338 including a ring 344 and a tongue 346 having an indicator surface 340 on the tongue 346 is received in the interior region 104 of the level indicator 326. The ring 344 includes a ring edge 348, as shown in FIGS. 11 and 12, that is arranged to define a center wall-receiving opening 350. The center wall 102 appended to wall 90 of the level indicator housing 88 is rotatably received by the center wall-receiving opening 350 so that the tongue 346 is free to swing about a pivot axis 352 of the center wall 102. The ring edge 348 is arranged to define a knife edge 354 that engages the center wall 102 in order to minimize the area of contact between the ring edge 348 and the center wall 102 and thereby reduce friction that can inhibit the rotating movement of the ring 344 around the center wall 102.

The window 328 is positioned to lie so that the indicator surface 340 of the tongue 346 is visible through the window 328 when the level indicator 326 is in the level orientation as shown in FIG. 13. In preferred embodiments, the indicator surface 340 is a bright color chosen to draw the attention of the care giver when the level indicator 326 is in the level orientation and the indicator surface 340 of the pendulum 338 is positioned adjacent to the window 328, as shown in FIG. 13.

When the level indicator 326 moves away from the level orientation of FIG. 13 and to a non-level orientation as shown, for example, in FIG. 14 in which the level indicator 326 is held at an angle 342 away from the level orientation, the weight of the tongue 346 of the pendulum causes the ring 344 to rotate so that the tongue 346 swings to a position away from the window 328. In this position, the indicator surface 340 of the tongue 346 is obscured by the wall 90 and is not visible to the care giver. A care giver would be informed, after glancing at level indicator 326 in the orientation of FIG. 14 and seeing no indicator surface, that the child seat 24 was not yet properly oriented on the seat (not shown) of the vehicle (not shown).

The level indicators 126, 226, 326, when appended to a child seat 24 installed on the seat of a vehicle (not shown) provide a care giver with a rapid and convenient indication of whether the child seat is properly oriented. Advantageously, the level indicators require the use of a minimum number of assembly parts while at the same time being mountable to various shapes and sizes of child seats 24.

Although the invention has been described in detail with reference to preferred embodiments, additional variations exist within the scope and spirit of the invention as described and defined in the following claims.

We claim:

1. A level indicator for a child seat equipped with a rotatable carrying handle, comprising:

a child seat having a pivotal handle rotatably attached thereto, a housing in said pivotal handle having a wall defining an interior region, an indicator member having an indicator surface, the indicator member being movably received in the interior region, and the wall being formed to include a transparent window defined by an edge, the edge being arranged so that the indicator surface is visible through the window when the level indicator is level, the indicator member moving entirely away from the window edge when the level indicator is not level so that the indicator surface is not visible through the window.

2. The level indicator of claim 1, wherein the wall includes a rear surface defining the interior region and a front surface spaced apart from the rear surface and further comprising means contacting the front surface of the wall for mounting the housing.

3. The level indicator of claim 2, wherein the mounting means includes a mounting member having means appended to mounting member for engaging the wall.

4. The level indicator of claim 3, wherein the engaging means is positioned to lie so that the wall is between the engaging means and the pivotal handle.

5. The level indicator of claim 1, wherein the wall is formed to include a track extending from the wall into the interior region and the track has an indicator member-receiving surface.

6. The level indicator of claim 5, wherein the track is an arcuate track and the indicator member-receiving surface is an upwardly-facing arcuate surface formed on the track.

7. The level indicator of claim 6, wherein the indicator member is a ball having an exterior surface, and the exterior surface of the ball includes the indicator surface.

8. The level indicator of claim 6, wherein the wall is flat and is formed to include a circumferential edge arranged to define a round shape for the wall, the housing further includes an outer annular wall appended to the circumferential edge and extending in a direction perpendicular to the wall, and the arcuate track is integrally appended to the outer annular wall.

9. The level indicator of claim 5, wherein the track is an inner annular wall.

10. The level indicator of claim 9, wherein the indicator member is a pendulum having a ring and a tongue, the indicator surface is appended to the tongue, the ring has an edge arranged to define an inner annular wall-receiving opening, and the inner annular wall is received by the inner annular wall-receiving opening.

11. The level indicator of claim 1, wherein the wall is opaque so that the indicator surface is not visible through the wall and the transparent window is arranged so that the indicator surface is visible through the transparent window when the indicator member is adjacent to the window and the indicator surface is not visible when the indicator member is away from the window.

12. The level indicator of claim 1, wherein the wall is flat and is formed to include a circumferential edge.

13. The level indicator of claim 12, wherein the pivotal handle includes a wall arranged to define a level indicator-receiving surface and the circumferential edge is arranged to engage the indicator-receiving surface.

14. The level indicator of claim 12, wherein the circumferential edge is arranged to define a round shape for the wall and the housing further includes an annular wall appended to the circumferential edge and extending in a direction perpendicular to the wall, the annular wall cooperating with the wall to define the interior region.

15. The level indicator of claim 14, wherein the pivotal handle includes a wall arranged to define a level indicator-receiving surface and the annular wall is arranged to engage the indicator-receiving surface.

16. A level indicator for a child seat equipped with a rotatable carrying handle, comprising:

a child seat having a pivotal handle rotatable attached thereto, a front wall located in said handle that is opaque and formed to include an interior surface, an arcuate track having a ball-receiving surface, a first end, and a second end, the arcuate track being appended to the interior surface of the wall, a ball movably positioned on the arcuate track for movement between the first end and the second end, and the wall being formed to include a transparent window defined by an edge, the edge being arranged so that the ball is visible through the window when the level indicator is level and the ball is positioned to lie adjacent to the window, the edge being spaced apart from the first and second ends of the arcuate track so that the ball is not visible through the window when the ball moves along the track away from the window when the level indicator is not level.

17. The level indicator of claim 16, wherein the wall is formed to include a front edge arranged to define a rod-receiving opening.

18. A level indicator for a child seat, the level indicator comprising a front wall that is opaque and formed to include an interior surface and a front edge defining a rod-receiving opening, an arcuate track having a ball-receiving surface, the arcuate track being appended to the interior surface of the wall, a ball movably positioned on the arcuate track, a transparent window formed in the wall and arranged so that the ball is visible through the window when the level indicator is level, and a rod and means for appending the rod to the child seat, the rod including a shaft sized to be received by the rod-receiving opening and a head integrally appended to the shaft and sized to be too large to be received by the rod-receiving opening, the head having a wall-engaging surface that engages the wall of the housing adjacent to the rod-receiving opening to hold the housing onto the child seat.

19. The level indicator of claim 16, wherein the wall is flat and includes a circumferential edge arranged to define a round shape of the wall.

20. The level indicator of claim 19, wherein an outer annular wall extending in a direction perpendicular to the wall is appended to the circumferential edge.

21. The level indicator of claim 20, wherein the arcuate track is integrally appended to the outer annular wall.

22. The level indicator of claim 20, wherein the pivotal handle includes a wall arranged to define a level indicator-receiving surface and the annular wall is arranged to engage the indicator-receiving surface.

23. The level indicator of claim 19, wherein the pivotal handle includes a wall arranged to define a level indicator-receiving surface and the circumferential edge is arranged to engage the indicator-receiving surface.

24. The level indicator of claim 16, wherein the ball includes an exterior surface having an indicator surface formed on the exterior surface.

25. A level indicator for a child seat equipped with a rotatable handle, comprising:

a child seat having a pivotal handle rotatable attached thereto, a wall formed in said handle, which wall has a front surface and rear surface spaced apart from the front surface, an arcuate track having a ball-receiving surface, the arcuate track being appended to the rear surface of the wall and extending rearwardly therefrom, a ball movably positioned on the arcuate track for movement to a first position when the level indicator is at a level orientation and movement to positions on the arcuate track away from the first position when the level indicator is at orientations other than the level orientation so that the position of the ball on the track provides an indication of the orientation of the level indicator, and means engaging the front surface of the wall for mounting the wall to the pivotal handle so that the wall is positioned to lie between the engaging means and the pivotal handle.

26. The level indicator of claim 25, wherein the wall is flat and includes a circumferential edge arranged to define a round shape of the wall.

27. The level indicator of claim 26, wherein an outer annular wall extending in a direction perpendicular to the wall is appended to the circumferential edge.

28. The level indicator of claim 27, wherein the pivotal handle includes a wall arranged to define a level indicator-receiving surface and the annular wall is arranged to engage the indicator receiving surface.

29. The level indicator of claim 26, wherein the pivotal handle includes a wall defining a level indicator-receiving surface and the circumferential edge is arranged to engage the level indicator-receiving surface.

30. The level indicator of claim 25, wherein the wall of the housing is opaque.

31. The level indicator of claim 30, wherein the wall of the housing includes a transparent window formed in the wall and arranged so that the ball is visible through the window when the level indicator is level.

32. A level indicator for a child seat equipped with a rotatable carrying handle, comprising:

a child seat having a pivotal handle rotatable attached thereto, a housing in said pivotal handle having a wall that is opaque and formed to include an interior region, a pendulum pivotably mounted to the wall to swing, the pendulum having an indicator surface, and the wall being formed to include an edge defining a transparent window, the edge being arranged so that the indicator surface is positioned to lie adjacent to the window and is visible through the window when the level indicator is level and is away from the window and is positioned to lie behind the opaque wall when the level indicator is not level.

33. The level indicator of claim 32, wherein an annular center wall is appended to the wall and projects into the interior region, and the pendulum is mounted to the center wall.

34. The level indicator of claim 33, wherein the pendulum includes a ring and a tongue, the ring is rotatably mounted to the center wall so that the tongue can swing relative to the housing, and the indicator surface is appended to the tongue.

35. The level indicator of claim 34, wherein the ring includes an edge defining a center wall-receiving opening and the center wall is received by the center wall-receiving opening.

36. The level indicator of claim 32, further comprising means appended to a front portion of the wall for mounting the level indicator.

37. A child seat having a level indicator, the child seat comprising a shell formed to include a head end, a foot end, and two longitudinally extending side walls therebetween, a U-shaped handle including two terminal ends having a first hub appended to the first terminal end and a second hub appended to the second terminal end, the hubs being rotatably mounted to the side walls, and a level indicator mounted to the first hub.

38. The child seat of claim 37, wherein the level indicator includes a front wall and a rod appended to the shell, the rod including a shaft received by the rod-receiving opening and a head integrally appended to the shaft and sized to be too large to be received by the rod-receiving opening, the head having a wall-engaging surface that engages an exterior side of the wall to hold the housing onto the first hub.

39. The child seat of claim 37, wherein the first hub further includes a hub wall arranged to define a level indicator container having a back wall and the level indicator engages the back wall.

40. The child seat of claim 39, wherein the level indicator includes a front wall that is opaque and formed to include an interior surface, an arcuate track having a ball-receiving surface, the arcuate track being appended to the interior surface of the wall, a ball movably positioned on the arcuate track, and a transparent window formed in the wall and arranged so that the ball is visible through the window when the level indicator is level.

41. A child seat having a level indicator, the child seat comprising an elongated shell formed to include a seat bottom having two spaced-apart side edges, a back edge, a seat back appended to the back edge and extending upwardly therefrom, two side arms pivotally mounted to the side edges and extending upwardly therefrom, the back edge defining a pivot axis for pivoting the child seat to adjust the rotational orientation of the child seat in a longitudinal direction, and a level indicator mounted to one of the side arms adjacent to the pivot axis.

* * * * *